(12) United States Patent
Bobbitt et al.

(10) Patent No.: US 7,024,427 B2
(45) Date of Patent: Apr. 4, 2006

(54) VIRTUAL FILE SYSTEM

(75) Inventors: Jared E. Bobbitt, Manhattan Beach, CA (US); Stephan A. Doll, Seattle, WA (US); Marc T. Friedman, Seattle, WA (US); Patrick Wing Sang Lau, Issaquah, WA (US); Joseph P. Mullally, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 534 days.

(21) Appl. No.: 10/025,005

(22) Filed: Dec. 19, 2001

(65) Prior Publication Data

US 2003/0115218 A1    Jun. 19, 2003

(51) Int. Cl.
    G06F 17/30    (2006.01)

(52) U.S. Cl. .................................... 707/200

(58) Field of Classification Search ............... 707/200, 707/201, 205, 100, 102, 1, 10
See application file for complete search history.

(56) References Cited

U.S. PATENT DOCUMENTS 5,778,384 A * 7/1998 Provino et al. ............. 707/200
6,061,692 A * 5/2000 Thomas et al. ............. 707/200
6,185,574 B1 * 2/2001 Howard et al. ............. 707/200
6,351,773 B1 * 2/2002 Fijolek et al. ............... 709/228
6,678,700 B1 * 1/2004 Moore et al. ................ 707/200
6,745,207 B1 * 6/2004 Reuter et al. ................ 707/200

OTHER PUBLICATIONS

Corbett et al. ACM Transactions on Computer Systems, discloses "The Vesta Parallel System"; vol. 14, No. 3; Aug. 1996, pp. 225-264.*

* cited by examiner

*Primary Examiner*—Frantz Coby
*Assistant Examiner*—Haythim Alaubaidi
(74) *Attorney, Agent, or Firm*—Van Pelt, Yi & James LLP

(57) ABSTRACT

A virtual file system and method. The system architecture enables a plurality of underlying file systems running on various file servers to be "virtualized" into one or more "virtual volumes" that appear as a local file system to clients that access the virtual volumes. The system also enables the storage spaces of the underlying file systems to be aggregated into a single virtual storage space, which can be dynamically scaled by adding or removing file servers without taking any of the file systems offline and in a manner transparent to the clients. This functionality is enabled through a software "virtualization" filter on the client that intercepts file system requests and a virtual file system driver on each file server. The system also provides for load balancing file accesses by distributing files across the various file servers in the system, through migration of data files between servers.

6 Claims, 14 Drawing Sheets

VIRTUAL FILE SYSTEM

BACKGROUND OF THE INVENTION

1. Field of the Invention

The present invention generally relates to network file systems and schemes, and more particularly, to a network file system that appears to its clients to be a single file system, while locating its files an directories on multiple server computers.

2. Background Information

File system growth management is a large and growing problem for the data centers of eBusinesses and corporate intranets. Depending on the source, data storage is estimated to be growing between 60% and 200% per year and accelerating. According to the Strategic Research Corp., the two major storage-related problems in the data center are managing disk space and running out of disk space. Information Technology (IT) administrators are also struggling with placing their key, most important data onto the best storage resource in their environment. With the explosion in growth, IT users are looking for alternative solutions that simplify growth management.

The most complex issue involving the growth of storage is the inability to manage storage environments efficiently and with qualified IT professionals. eBusinesses today are facing an influx of new storage technologies (e.g., network-attached storage (NAS) and storage area network (SAN)), which increase their storage capacity, speed, and availability, but in ways have made storage architectures more complex. When new technologies are deployed, IT professionals must quickly ramp up and learn these new technologies, and with the current lack of skilled IT talent (~600,000 unfilled IT positions today), falling behind is easy. In fact the cost of managing high-performance storage environments is estimated to be far greater than the cost of purchase—by three to ten times. The required ongoing investments in both hardware/software and people into these storage architectures will continue to rise.

In many enterprises, data is distributed among various "islands of storage," which are cut off from each other by their means of attachment, physical location, management policy, or software incompatibility. These islands require applications to select and name the specific hard-wired server hosting the desired files. Typically, when applications outgrow their islands, IT administrators must bring down the applications, add new storage devices, partition and move some of the data, and reprogram the applications to make them aware of the new division of resources.

At the high end, customers can opt for SAN solutions, which are extremely expensive to purchase and maintain, and require a commitment to proprietary hardware. SAN architectures do allow for considerable scalability, flexibility and performance, but at a very high cost. A lower-cost storage solution is available: file servers. Network attached storage (NAS) devices and General Purpose File Servers (GPFS) provide interoperable, incremental, and somewhat scalable storage. However, each NAS device or GPFS sitting on a LAN has limited throughput. It is an island unto itself. IT departments have to statically partition their storage among these islands, which has a number of unpalatable consequences.

SUMMARY OF THE INVENTION

The present invention comprises a virtual file system and method that addresses many of the foregoing limitations found in the prior art. The system architecture enables file systems to be virtualized. The system provides one or more virtual file system volumes each of which appears to be a normal file system while in reality the files in each virtual file system may be stored on many file systems on a plurality of file servers. File systems manifest themselves to users as a hierarchy of directories (also known as folders) containing files. The virtual file system also manifests itself the same way. Unique to the invention is the independence of the name and position of a file in this hierarchy, from its location on one of the plurality of file servers. This virtualization functionality is facilitated through the use of a software layer that, for each virtual volume and file pathname, intercepts file system requests and maps the virtual pathname to the actual server and pathname under which the file is stored. This scheme is implemented on a set of computers called the virtual file system cluster. They are a cluster in the following senses: they are attached via a local area network; they share key configuration data; they communicate with each other to provide users the same virtual file system interface; and they are configured, monitored, and managed via a unified management console application. The invention operates through the use of two software components on each machine in the virtual file system cluster: 1) an "agent" software module that maintains the global configuration state of the system, and 2) the file system interception layer itself. For UNIX variant and LINUX variant clients, the agent is implemented as a user-level process while the interception layer is implemented as a kernel-loadable module.

In one embodiment, the virtual file system enables users to create virtual file hierarchies that are mapped behind the scene to one or more logical volumes on one or more servers. The actual hierarchy of directories and files comprising the portion of a single logical volume devoted to a particular virtual file system is called a gtree. Each virtual file system has two kinds of gtrees: a single master gtree and one or more slave gtrees. The master gtree functions as a centralized name service for the entire virtual file system, containing the directory names, attributes, and contents, and the file names. The slave gtree serves as a storage server, containing the file attributes and contents. For each file, the master gtree contains a file pointer that contains the file's unique identifier and the identifier of the slave on which the file's contents and attributes are located. In addition, each directory contains a special file with a reserved name that contains a unique identifier for that directory.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
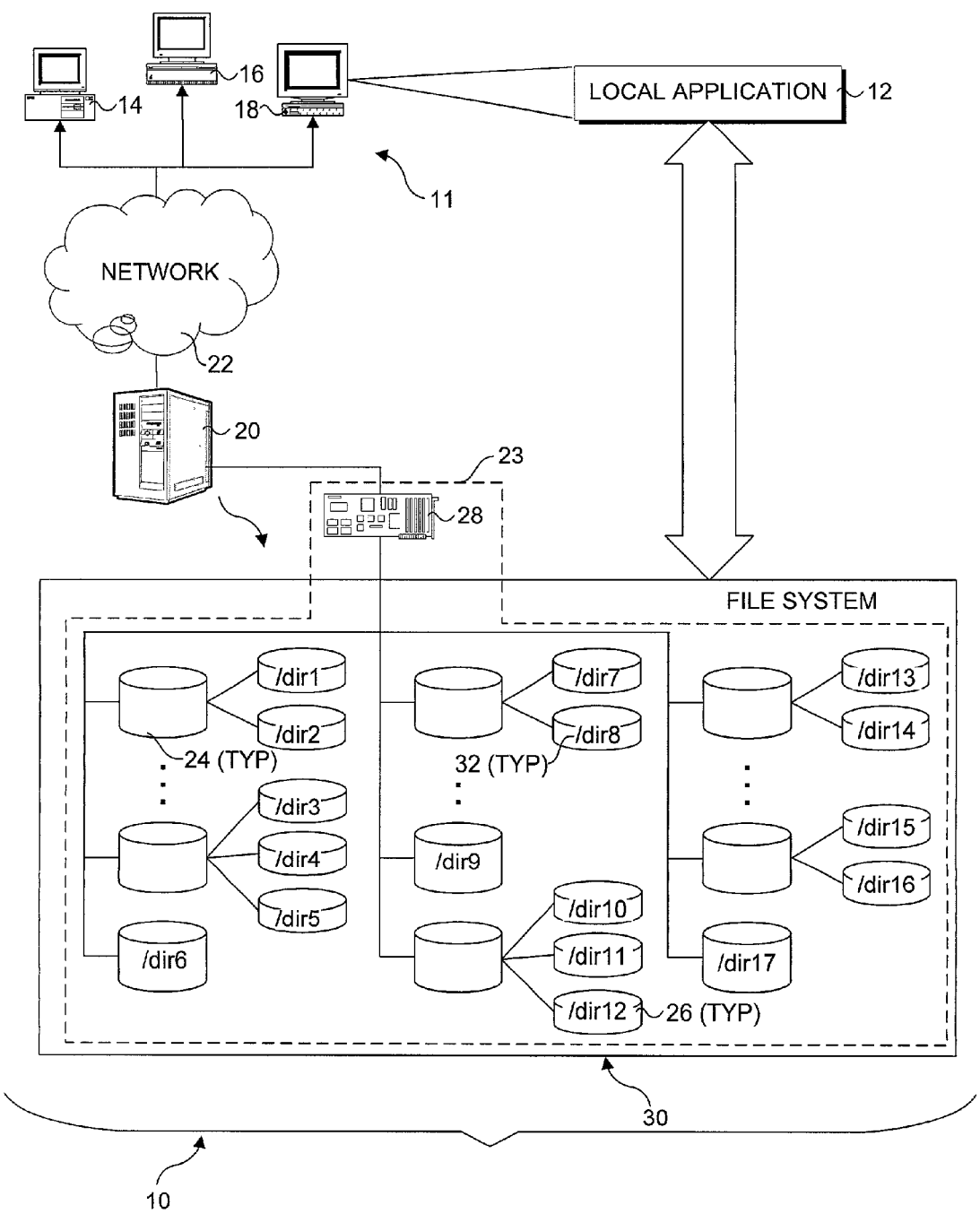
FIG. 1 is a schematic diagram depicting a conventional NFS file system that is hosted by a single file server.

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Definitions

Several standard terms used in the following description of the invention will be defined. A logical volume is a set of block storage resources managed as a unit by a single host computer, with the following usual characteristics: persistence of files when the computer turns on and off, a fixed storage size and replication strategy (e.g., RAID-5, mirrored, or none), and an associated set of one or more partitions on one or more physical storage media. A local file system is an organizational structure for storage of computer files managed by a single host computer with the following usual characteristics: persistence of files when the computer turns on and off, fixed storage size, and a unified hierarchy of directories (a.k.a. folders). A file system provides access to files and directories indexed by their pathname, the sequence of enclosing directories (folders), followed by the simple name of the file. A network file sharing protocol is a standardized communication interface for computer servers to share local file systems to other computers connected by a network. Network file sharing protocols allow multiple computers to use a single file system, as if the file system was local to each computer, regardless of where it actually resides. A server or file server is a computer system that is used to host a file system. A vnode is a data structure that contains information about a file in a UNIX file system under the SUN SOLARIS™ operating system.

A virtual file system (a.k.a. virtual volume) is a file system, except that rather being managed by a single host computer, it consists of a set of file systems or logical volumes on one or more host computers. Although the virtual file system functions as a single local file system to each client, its files are in fact partitioned among multiple underlying file systems. Moreover, client applications and users are not aware that the file system is virtual, nor are they aware of the various locations of the files. The term virtualized refers to the invention's ability to enable the creation of one or more virtual file systems comprising files and directories stored on one or more logical volumes on one or more file servers, wherein applications and users who access those files are not aware of their location.

The present invention enables file systems to be easily scaled through the use of a virtualized file system architecture and method. In the following description, the terms "Gossamer," "Gossamer virtualized file system" and "Gossamer file system," are used synonymously throughout to refer to exemplary virtual file system implementations in accordance with the invention.

A Conventional Approach

FIG. 1 shows a conventional network file system (NFS) protocol file system 10 that enables local applications 12 running on various clients 11, including personal computers 14 and 16 and a UNIX workstation 18, to access files (i.e., store, retrieve, update, delete) that are stored on a file server 20 via a network 22. In typical environments, network 22 will comprise a LAN (local area network) or WAN (wide area network).

File server 20 includes a disk sub-system 23 comprising a plurality of storage devices 24 (e.g., hard disks), each of what may be partitioned into one or more logical partitions 26. Operating system software may be present that organizes one or more devices into a single addressable storage space known as a logical volume. The volume management software allows the addressable units to include multiple devices or partitions, with or without mirroring, RAID, remote replication, snapshot, hot-swap, or dynamic expansion functionality. All of this is invisible to, and unrelated to, the file-system software using the logical volume, to which this invention pertains. The term "volume" will be used herein to refer to an addressable unit of disk, with the understanding that if volume management software is installed, then the volume is a logical volume, otherwise, it is merely a storage device or partition thereof. Generally, storage devices 24 may be accessed via one or more device controller cards 28 connected to the file server's motherboard. Optionally, the functionality provided by such a device controller card may be built into the motherboard. In many implementations, device controller card 28 will comprise a single or multi-channel SCSI (small computer system interface) card that enables access to 14 storage devices per channel.

In typical implementations, storage devices 24 may be housed within file server 20's chassis, or may be disposed in an external cabinet linked to the file server via one or more communications channels. For example, many modern file servers provide "hot swap" drives, which enables network managers (and others) to easily remove, add and/or replace drives without having to shut down the server the drives are installed in.

Figure 2:
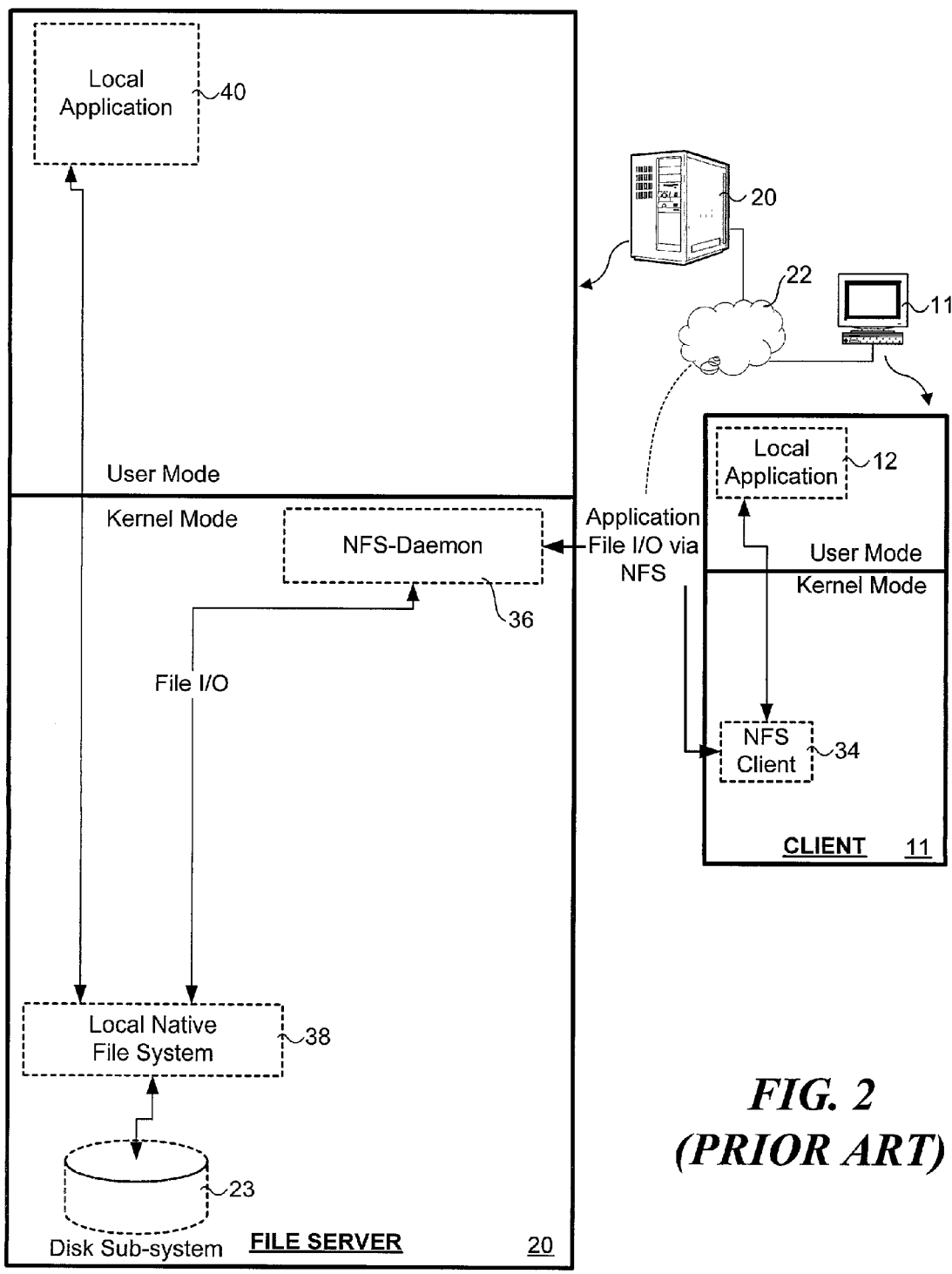
FIG. 2 is a schematic diagram illustrating the primary software components of the conventional NFS file system of FIG. 1.

From the viewpoint of local applications 12 running on clients 11 sharing files from the file server 20, a volume managed by that file server 20 appears to be a local file system 30. On a network with a UNIX file server using the NFS file sharing protocol, a local file system consists of a volume and a single hierarchical tree structure of directories with files at the leaves. The base of the tree is called the root directory 32. The file server exports part or all of the local file system for remote access. The "export" is the point in the hierarchy that appears to remote users to be the root. If the export is the local file system root, then the entire local file system is exported. A block-level schematic diagram corresponding to conventional NFS file system 10 is shown in FIG. 2. As illustrated, local applications 12 that are running in the user mode level of the clients operating system (OS) are provided access to the file system via a client-side NFS client 34 running at the kernel mode level of the client's OS, and an NFS Daemon 36, running on file server 20 at the kernel mode level of the server's OS. NFS daemon 36 provides an abstracted interface between a local native file system 38 running on file server 20 and NFS clients running on various client machines 11, whereby a single set of NFS commands can be used for any type of file system supported by variants of UNIX. The NFS daemon and the server operating systems provide a uniform NFS interface to the NFS clients using the various local file system types, whether they be ext2, UFS, VxFS, or any file system supported by NFS.

In addition to supporting client requests, there will generally be one or more local applications 40 running at the user mode level of the server accessing the local native file system 38 for management purposes, such as backup and restore utilities.

The conventional scheme suffers from a static mapping of file systems to file servers. This has several unpalatable consequences. Planning is difficult. Only one thing is certain about a static division of resources—you can't get it right ahead of time. Some islands of storage will be overtaxed long before the rest. Hot spots and above-trend growth will eventually bring existing resources to their knees, making some key data unavailable, and resulting in semi-unplanned, labor-intensive reconfiguration. The only way to delay reconfiguration is by throwing more hardware at the problem early, resulting in excess costs and unused resources. Under conventional file system operations, the only way to cure an overtaxed server is to take the file system offline, adding a new server, and reconfiguring the file system to divide the data up between servers. After such a reconfiguration is completed, applications will typically need to be changed to access the data in their new locations. This can be easy or impossible, depending on how well the applications are architected for such changes.

Gossamer Virtual File System Architecture

The Gossamer virtual file system takes the next step beyond the sharing of a single file system by freeing the file system from the bounds of its host. Gossamer comprises a software subsystem that manages vitualized file systems—that is, file systems without a single host. Each virtualized file system (called a Gossamer virtual volume, or GVV) has all of the usual characteristics of a file system except that rather than having a fixed server, it is hosted on a dynamic set of (generally) smaller server computers. A client computer, through a Gossamer client-side component, can access the entire virtualized file system using conventional network file sharing protocols, such as NFS. Furthermore, Gossamer can aggregate together all the storage capacity provided to it by the server computers, such that the total capacity of the virtual file system comprises the totality of the storage capacity of the underlying servers, which may be easily scaled by adding additional servers.

Gossamer enhances the client-server file-sharing model with location-independent access, which provides a significant advantage over the prior art. A conventional NFS shared file system has three aspects: an exported directory hierarchy (i.e., the exports), physical disk space, and a server. In contrast, a GVV abstracts the file system from the server. A GVV has an exported directory hierarchy and physical disk space, and a Gossamer GVV name, rather than a server name. Clients access GVVs as though they are NFS file systems, and Gossamer takes care of locating and accessing files on the proper servers.

A Gossamer file system is hosted on one or more server computers (i.e., file servers). Each file server hosts one or more volumes, referred to herein as bricks. An instance of a local file system software module (such as VxFS, UFS, or ext2) manages the layout of a brick. This module will be referred to herein as the "underlying file system," since it is provided by another vendor and is accessed by this invention through a standard interface. On each volume, one or more gtrees—the building blocks of a GVV—are created as separate hierarchies on the underlying file system. A GVV is a collection of gtrees working in concert. Two GVVs may not share any gtrees. Users of files see only the GVVs, which work like first-class file systems, except that they appear to each client computer to be local file systems.

Gossamer's functionality is achieved through the interaction of two separate software components: a server-side file system component called GFS, and a client-side virtualization component, called GVFD (Gossamer Virtualizing Filter Driver). Both of these components are implemented as filters that intercept, translate, and reroute file system traffic. In the SOLARIS™ operating system (a variant of the UNIX operating system manufactured by the Sun corporation), the interface it intercepts is known as the vfs/vnode interface.

GFS comprises a server-side layer of abstraction that manages reference counting and migration. An instance of the GFS component runs on the server that hosts the corresponding underlying file system managed by that GFS instance. The GFS instance is implemented as a local file system that exports the vfs/vnode interface for the SOLARIS™ operating system. Each instance of GFS maintains data structures that are used to manage a single gtree.

GVFD runs on any client machine (also called a storage client) accessing a Gossamer file server (i.e., a computer on which at least one of the underlying file system is hosted). An instance of GVFD manages access to a single GVV from a single client. It maps virtual file names to physical locations for those files, and routes messages to appropriate servers, where they are ultimately received by GFS instances. An optional GVFD module may also run on the server if there are any applications (such as backup) on the server that need to access the virtual file system.

Figure 3:
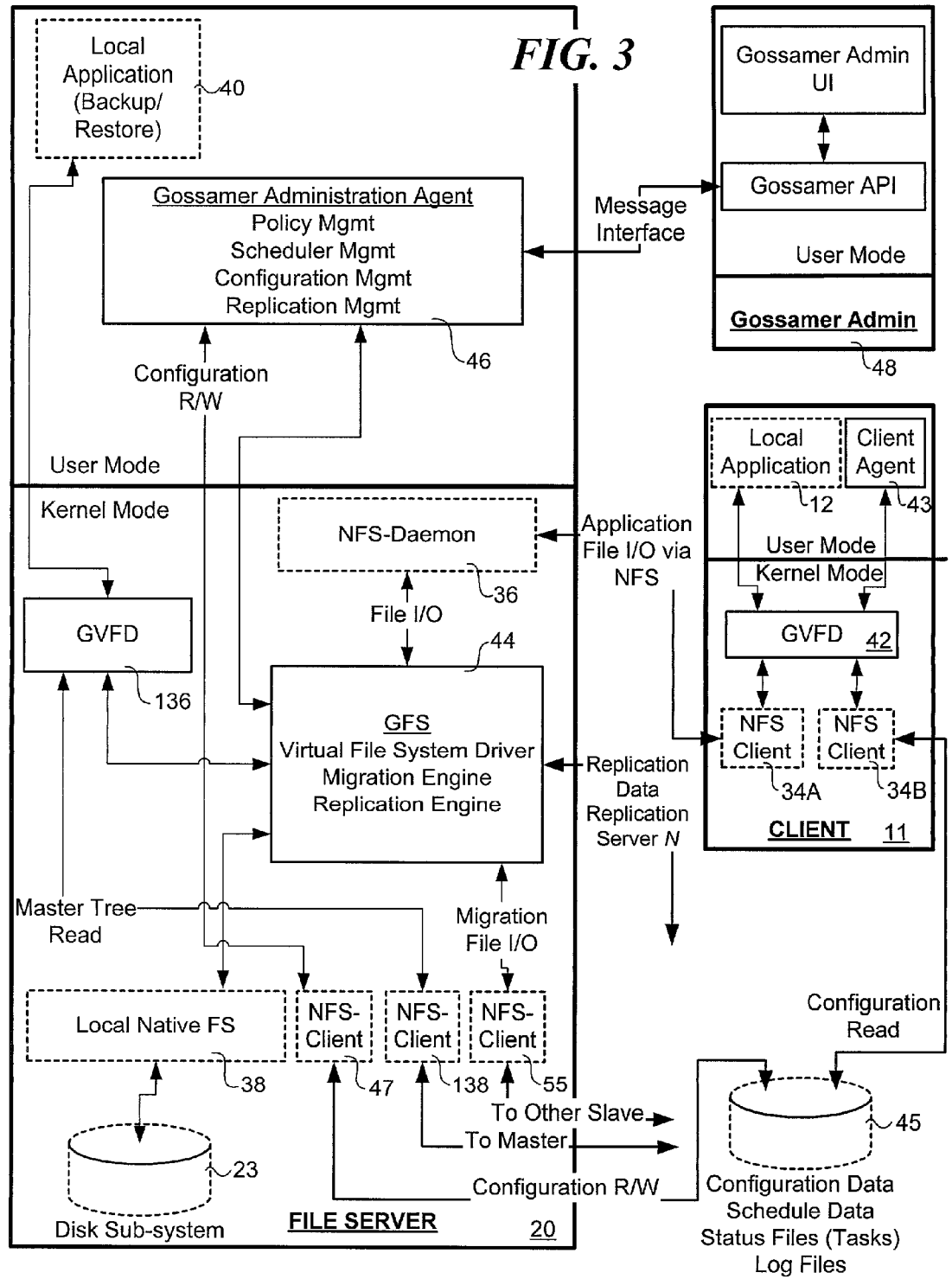
FIG. 3 is a schematic diagram illustrating the primary software components of the virtual file system of the present invention when implemented using conventional file servers that host underlying NFS file systems.

An overview of the Gossamer virtual file system is shown in FIG. 3, wherein solid-lined boxes correspond to components of Gossamer, while boxes with dashed outlines correspond to conventional applications and OS components. On the client side, a GFVD module 42 runs at the kernel mode level on client 11, and accesses external file servers, such as file server 20, via an NFS client instance 34A. In addition, a Gossamer client agent 43 runs at the user mode level on client 11, and accesses configuration information 45 via an NFS client instance 34B. On the server side, a GFS module 44 runs at the kernel mode layer on file server 20, which includes a virtual file system driver, a migration engine, and a replication engine. The server side also includes an administration agent 46, running at the user mode level on file server 20, which is used in conjunction with a Gossamer Administration service 48 running on an external machine or the server to enable administrators to manage various virtual file system functions, including migration policies and schedules, file system configurations, and replication. Gossamer Administration Agent 46 reads and writes to configuration information 45 via an NFS client instance 47.

Figure 4:
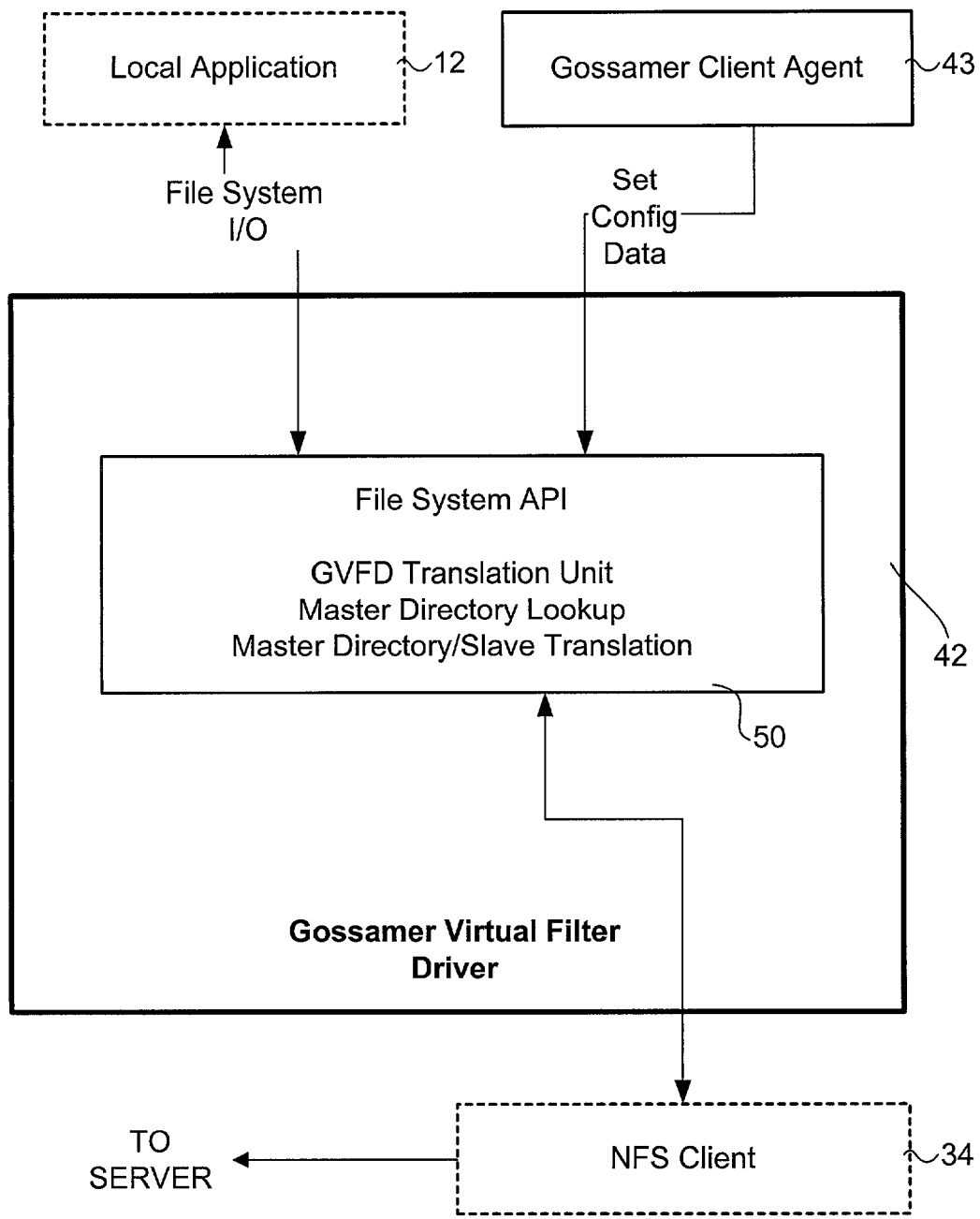
FIG. 4 is a schematic diagram illustrating further details of the virtual filter driver used on the client side of the system of FIG. 3.

Further details of GFVD module 42 are shown in FIG. 4. The GVFD module includes a file system API, a GVFD translation unit, a master directory lookup, and performs master directory/slave translation, all collectively identified by a block 50. GFVD module 42 functions as a filter that intercepts NFS file access requests, and translates those requests so they are sent to an appropriate server.

Figure 5:
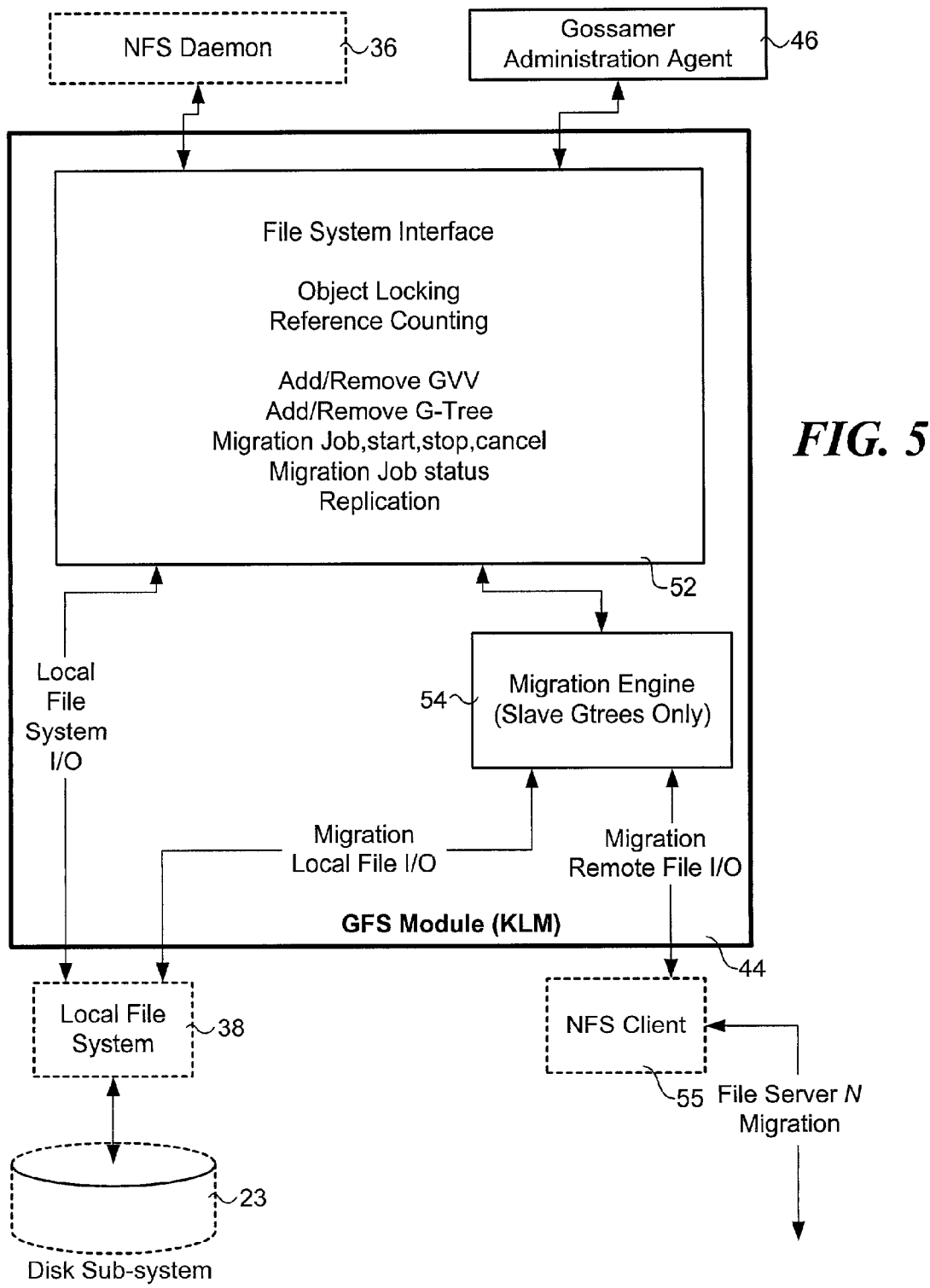
FIG. 5 is a schematic diagram illustrating further details of the GFS module that is implemented as a file system interception layer on the server side of the system to augment conventional file system behavior.

As shown in FIG. 5, GFS module 44 provides several server-side functions that are collectively identified by a block 52, including a file system interface, file system pass-through, object locking, reference counting, driver communication, adding and removing GVVs, adding and removing gtrees, migration job start, stop, and cancel, migration Job status, and replication. In the SOLARIS™ operating system, the Gossamer file system driver is loaded into the OS as a kernel loadable module (KLM).

Included in the functions performed by GFS module 44 are data file migration and maintaining configuration information 45. Migration of data files is enabled through the use of a migration engine 54 that accesses data files that may be stored locally or stored on a remote file server N via an NFS client instance 55.

Configuration information 45 includes configuration data that identifies what physical server(s) the various gtrees for a given GVV are hosted on, what physical devices the master and slave gtrees are stored on, the exports each server provides, and the roles played by the various components in a Gossamer virtual file system. Configuration information also may include schedule data (i.e., data pertaining to when migrations are to be performed or considered, when backups are to occur, when the background consistency checker may run, etc.), status files pertaining to operations in progress, such as migration and backup operations, and log files. The configuration information may be stored on one of the servers used to store the master gtrees and/or the slave gtrees, including file server 20, or may be stored on a separate server that is not used to store file system data files that are part of a GVV.

Gossamer uses local constructs called gtrees, which contain data corresponding to individual file systems to encode a single location-independent file system. This is accomplished by splitting the file system data into two parts, and storing the corresponding data into two separate types of gtrees. Metadata corresponding to a virtual directory and pathname hierarchy is stored on the master gtree, which functions as a name service. In one embodiment, the master name service for a GVV uses multiple gtrees as replicas. The file system data (i.e., data files and directories) is partitioned among multiple slave gtrees, which function as storage servers for file data. In one embodiment, each data file is stored on a single slave gtree. It is noted that in this embodiment redundant copies of a data file may be stored in multiple locations by the underlying file system, volume management software, or disk controller (e.g., a mirrored drive, RAID scheme, etc.); however, from the perspective of the Gossamer file system, the data file is manifest as a single local file.

The directories and their contents and attributes are stored in the master gtree. Files and their contents and attributes are stored on the slave gtrees. The master and slave gtrees are connected by file pointers, which are objects on the master gtree that map from the file's virtual pathname to a globally unique identifier (GUID) for the file and the gtree that hosts it. In general, the master gtree is hosted on a single volume, while the slave gtrees are hosted on one or more volumes that may or may not include the volume the master gtree is hosted on.

In the following description and Figures, various data corresponding to an exemplary Gossamer file system are presented. It will be understood that actual implementations of Gossamer file systems may comprise millions of directories and files, and may reside on a single file server, multiple file servers on the same LAN, as well as a combination of local and remote file servers (servers on a WAN).

Figure 6:
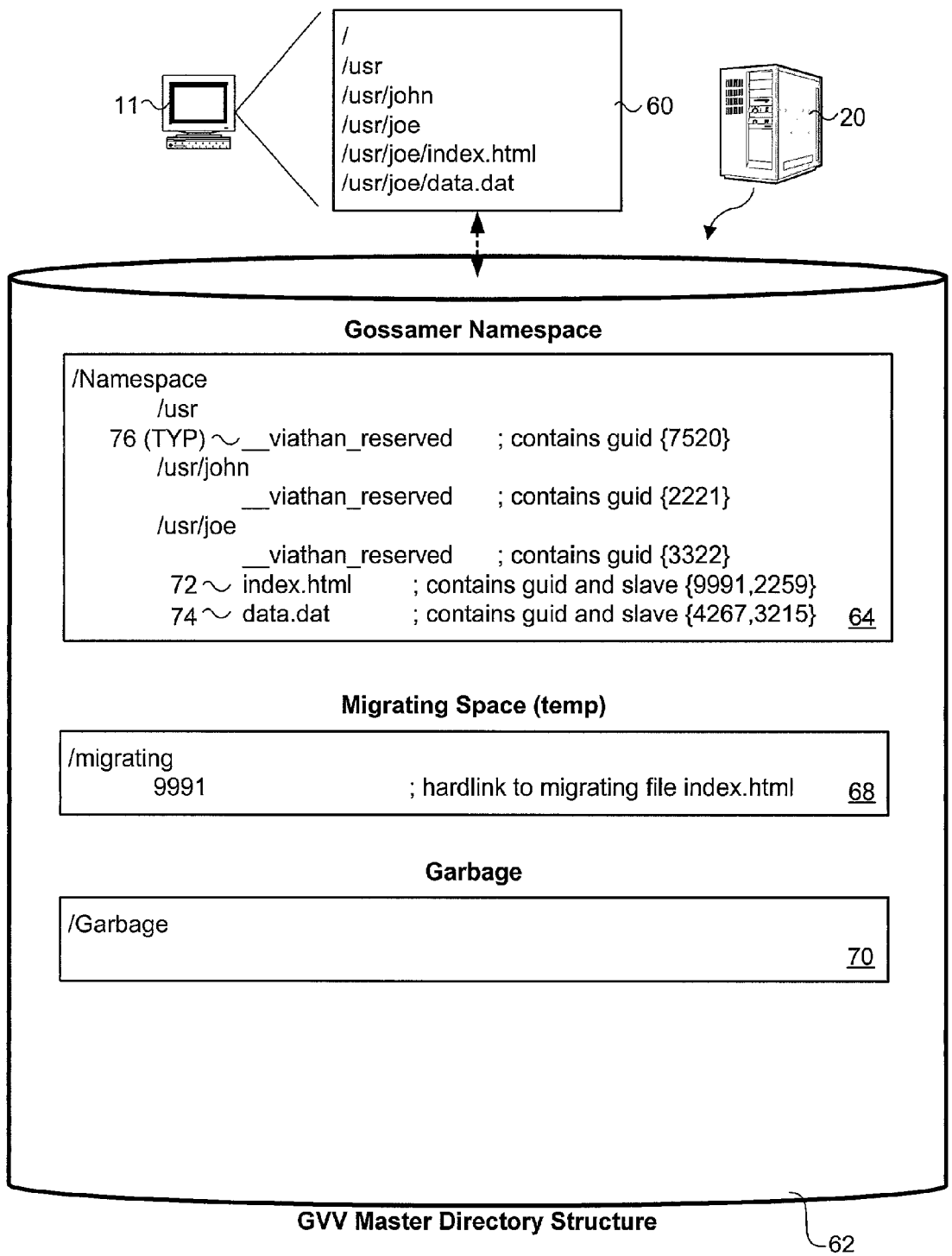
FIG. 6 is a schematic diagram that illustrates how data is stored in the master gtree (master directory structure) in accordance with the invention.

As shown in FIG. 6, from a user's viewpoint, such as client 11, the exemplary virtual file system is exported such that it appears to have a virtual directory and file hierarchy structure 60, also referred herein as the user-view tree 60. Notably, the user-view tree corresponds to a "virtual" directory and file hierarchy because users name objects in the hierarchy using a GVV and virtual pathname that is entirely location-independent. Translations between virtual pathname and actual server-pathname combinations are handled, in part, through data stored on the GVV master, as depicted by GVV master directory structure 62. The GVV master directory structure logically divides its data into three spaces, each having a separate subdirectory name stored under a common root. These spaces include a Gossamer namespace 64 stored in a "/Namespace" subdirectory, a temporary migrating space 68 stored in a "/migrating" subdirectory, and a garbage space 70 stored in a "/Garbage" subdirectory.

The directory structure stored in Gossamer namespace 64 parallels the virtual directory hierarchy, wherein the files contained (logically) in the virtual directories are replaced by file pointers having the same names as the original files. For example, in user view tree 60, there are two files under the "/usr/joe" subdirectory: "index.html" and "data.dat." Accordingly, respective file pointers 72 and 74 to these files having the same name and located in the same subdirectory path ("/usr/joe") relative to the /Namespace directory are stored in Gossamer namespace 64.

Each of the file pointers comprises a very small file containing two pieces of information: a file GUID (guid) corresponding to the file itself, and a GUID slave location identifier (loc) that identifies the gtree the file is located on. The gtree and file GUID are sufficient to retrieve the file's attributes and contents. For example, file pointer 72 corresponding to the "data.dat" file has a file GUID of 4267, and a slave location identifier of 3215.

In one embodiment, the file and directory GUIDs are 128-bit identifiers generated by modern computers to be globally unique. The slave location identifiers are also 128-bit GUIDs. The values for the GUIDS discussed above and shown in the Figures herein are simplified to be four-digit base-ten numbers for clarity.

File systems do not directly support the use of binary names. Rather, the files and directories hosted on a file system use alphanumerical names. Accordingly, in one embodiment, the GUIDS are encoded using a reversible mapping into alphanumerical strings. For example, the following encodings are appropriate for file systems supporting a Latin character set. The four-bit encoding is as a 32-byte lower case hexadecimal string. Another encoding is the following six-bit encoding, which results in a 22-byte string representation in Latin. Each character represents six contiguous bits of the GUID, so 22 characters represents 132 bits, the last 4 of which are always zero.

There are 64 possibilities for a sequence of six bits, each of which matches a Latin symbol:

'A'=0

'B'=1

. . .

'Z'=25

'a'=26

'b'=27

. . .

'z'=51

'0'=52

'1'=53

. . .

'9'=61

'_'=62

'-'=63

Figure 7:
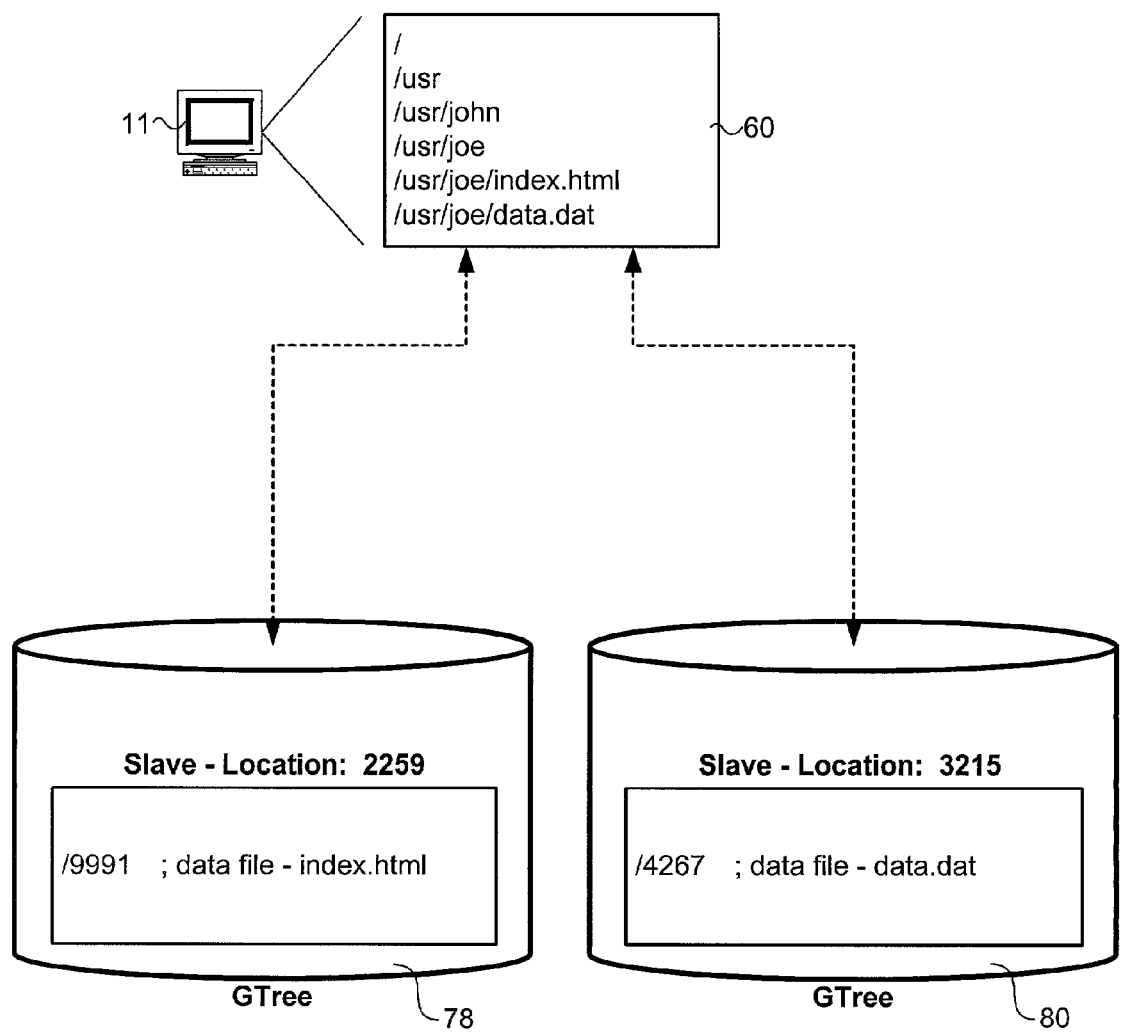
FIG. 7 is a schematic diagram illustrating how data is stored on the slave gtrees of the present invention.

As discussed above, the data files themselves are stored on slave gtrees that are separate from the master gtree. An exemplary storage scheme corresponding to the present example is illustrated in FIG. 7. As depicted in Gossamer Namespace 64 of FIG. 6 and discussed above, "index.html" file pointer 72 contains a slave location identifier of 2259 and a file GUID of 9991. This slave location is located in a gtree 78 shown in FIG. 7, and contains a file named "9991" corresponding to the to the "index.html" data file in user view 60. Similarly, data file "data.dat" is stored on a gtree 80 in a slave location having a slave location identifier of 3215 in a file named "4267."

Each slave gtree is exported by GFS 44 as a flat storage space, e.g.,:

/Guid1

/Guid2

/Guid3

In one embodiment, the underlying storage is hierarchical, to support fast lookup using underlying file system implementations that store directories as linked lists. The hierarchy is hidden by GFS 44 by cleverly translating all lookup, create, and delete calls into sequences of lookups down the hierarchy followed by the desired lookup, create, or delete call itself.

Rules of thumb in the industry suggest that performance problems are noticeable with more than about 100,000 objects in a single directory on most local file systems for UNIX-style operating systems. To target a limit of $2^{16}$ (about 65,000) objects maximum in any directory, a two-level hierarchy provides the ability to support over 4,000,000,000 directories on a single partition. Instead of putting all the slave directories under the root directory, the slave directories are put in a /<string> directory, where string comprises a predetermined substring of the name of the GUID. For example, when a six-bit encoding is used, using a three-digit portion of the GUID provides $2^{18}$ unique combinations for string. Under this embodiment, there will be on average about $2^{14}$ objects in each when the total number of objects reaches 4,000,000,000. In a four-bit encoding, a four-digit portion of the name will provide $2^{16}$ directories under the root directory, and room for $2^{16}$ objects in each of these directories. If it is desired to provide access to more than 4,000,000,000 files, then another level should be placed in the hierarchy.

Preferably, string should be generated from the portion of GUID bits that are changing most rapidly. For example, with a GUID generator commonly used by modern computer systems, bits 17–32 are the fastest-changing bits. Accordingly, bits 17–32 should be used to generate string on these computers.

Figure 8:
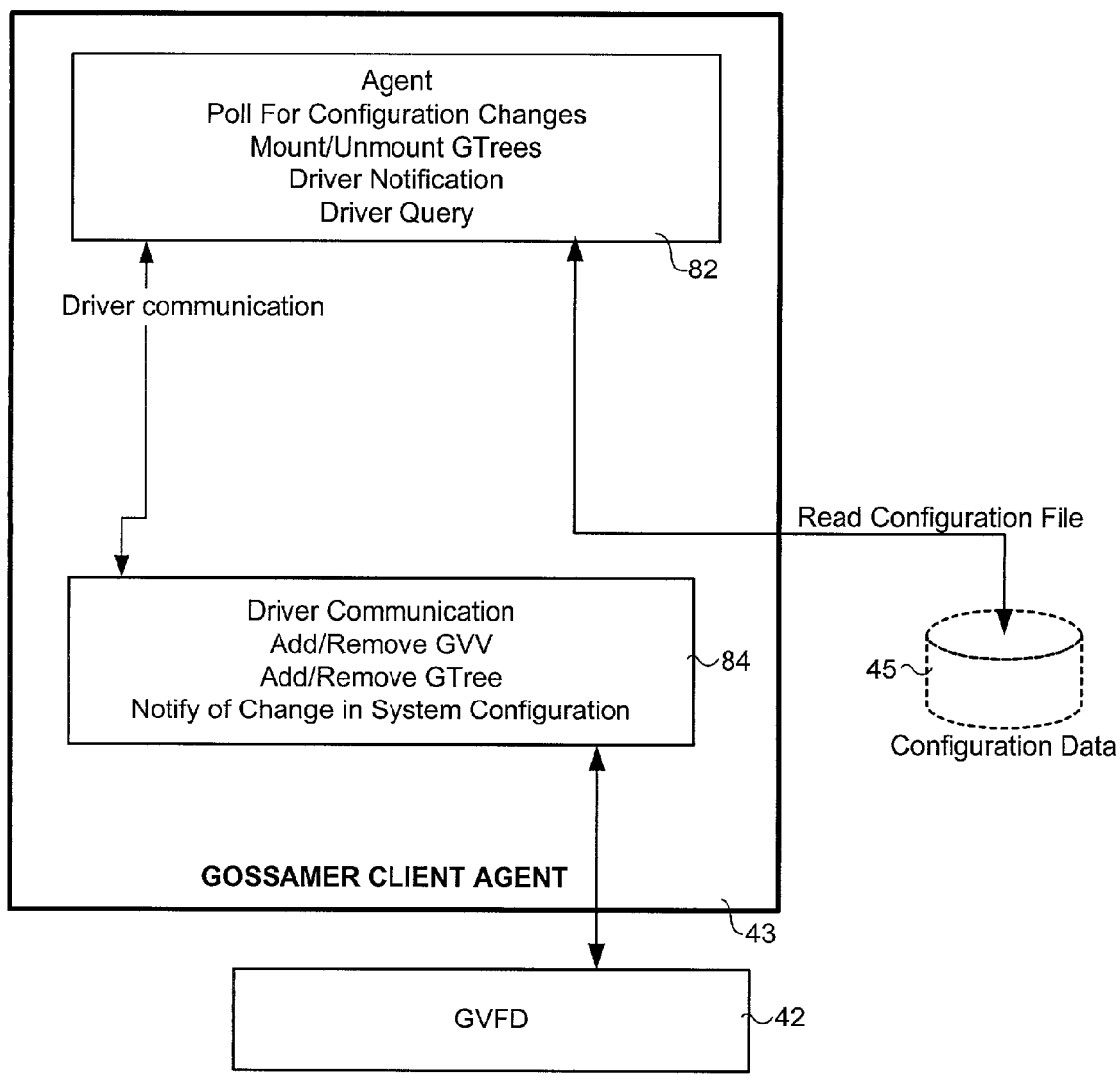
FIG. 8 is a schematic diagram illustrating the primary operations and interfaces provided by a client agent that runs on clients to facilitate operation of the virtual file system of the present invention.

Further details of Gossamer client agent 43 are shown in FIG. 8. As indicated by an agent module 82, Gossamer client agent 43 functions as a UNIX agent that performs polling for configuration changes, mounts gtrees (i.e., mounts the underlying file system corresponding to the gtree), and provides an interface for a centralized administration module to communicate with the GVFD module. Agent module 82 communicates with GVFD 42 via a driver communication module 84, which provides a driver communication interface, and enables GVVs and gtrees to be added and removed. Agent module 82 is also enabled to access configuration information 45.

In embodiments implemented using the SUN SOLARIS™ operating system, the GVFD, master GFS, and slave GFS cooperate to implement each operation of the SOLARIS™ vnode/vfs interface in a way that provides a single user view of the entire virtual file system. The invention relies on the cooperation of all these software components for normal operation. In particular, the lookup command is responsible for locating files, to which other requests are then routed. The create operation also is critical, since it selects a slave for a file to be located on. In general, the slave for storing a new file may be selected using various criteria, including storage space and load-balancing considerations. In one embodiment, new files are stored on the slave with the largest free disk space.

Vnode/vfs requests that are used by one embodiment of the invention are detailed in TABLE 1 below. For each vnode/vfs request, TABLE 1 describes the handling that occurs when a GVFD instance receives the request. The column headed "Where is the Logic" indicates whether the GVFD does the operation alone (client) or forwards the operation to the appropriate GFS instance (master or slave or both). The column headed "Modifies Metadata" indicates whether the operation changes any data on the master GFS. The default treatment of an operation is "pass-through," in which case the request is forwarded to the correct file server and then from the file server to the correct underlying file system and object. In pass-through operations the interception layers are passive. One operation (create) results in two client messages resulting in modifications to both the slave and the master data. Two operations (remove and rename) result in master-slave communication, and result in modifications to both the master and the slave data.

TABLE 1

| VFS/Vnode Request | Where is the Logic | Modifies Metadata | Notes |
|---|---|---|---|
| access dir | master | No | pass-through |
| access file | slave | No | pass-through |
| close | master + slave | No | Since metadata writes are always followed by fsync, close need not force an extra fsync |
| create | slave then master | yes | Three steps: create empty file on slave, create file pointer on master, fill file pointer with identity and location of empty file. |
| fsync | slave | Yes | Pass-through |
| getattr, getsecattr dir | master | No | Pass-through |
| getattr, getsecattr file | slave | No | Pass-through |
| link | master | yes | pass-through |
| lookup | master then slave | No | Gets file pointer then file. Attributes are those of the file. File pointer may be cached on client. |
| map file | slave | No | pass-through |
| mkdir | master | yes | pass-through |
| open | client | No | Only affects NFS client module on client |
| poll dir | master | No | pass-through |
| poll file | slave | No | pass-through |
| read, write, putpage, getpage, pageio, readlink | slave | No | pass-through |
| readdir | master | No | pass-through |
| remove | master (which sends message to slave) | yes | Two steps: master removes file pointer, then forwards remove to slave |
| rename | master | yes | May result in remove of target, which works like 'remove' above |
| rmdir | master | yes | Inverse of mkdir |
| rwlock, rwunlock, shrlock dir | master | yes | pass-through |
| rwlock, rwunlock, setfl, shrlock file | slave | No | pass-through |
| seek | slave | no | pass-through |
| setattr, setsecattr dir | master | yes | pass-through |
| setattr, setsecattr file | slave | yes | pass-through |
| space | master + slave | no | pass-through to both |
| symlink | Master | Yes | pass-through |

The Gossamer file system enables clients to access any data file within the aggregated storage space of a GVV through cooperation between the client-side GVFD and server-side GFS's corresponding to both the master and the slave volumes. In general, access functions include functions that are typically used to manipulate or obtain data from a data file, includes ACCESS, READ, WRITE, GETATTR, SETATTR, etc. These access functions are always preceded by a LOOKUP function which determines the physical location of the data file (file server and physical pathname) based on its virtual pathname. The LOOKUP function is performed by block 90–95 below.

Figure 9:
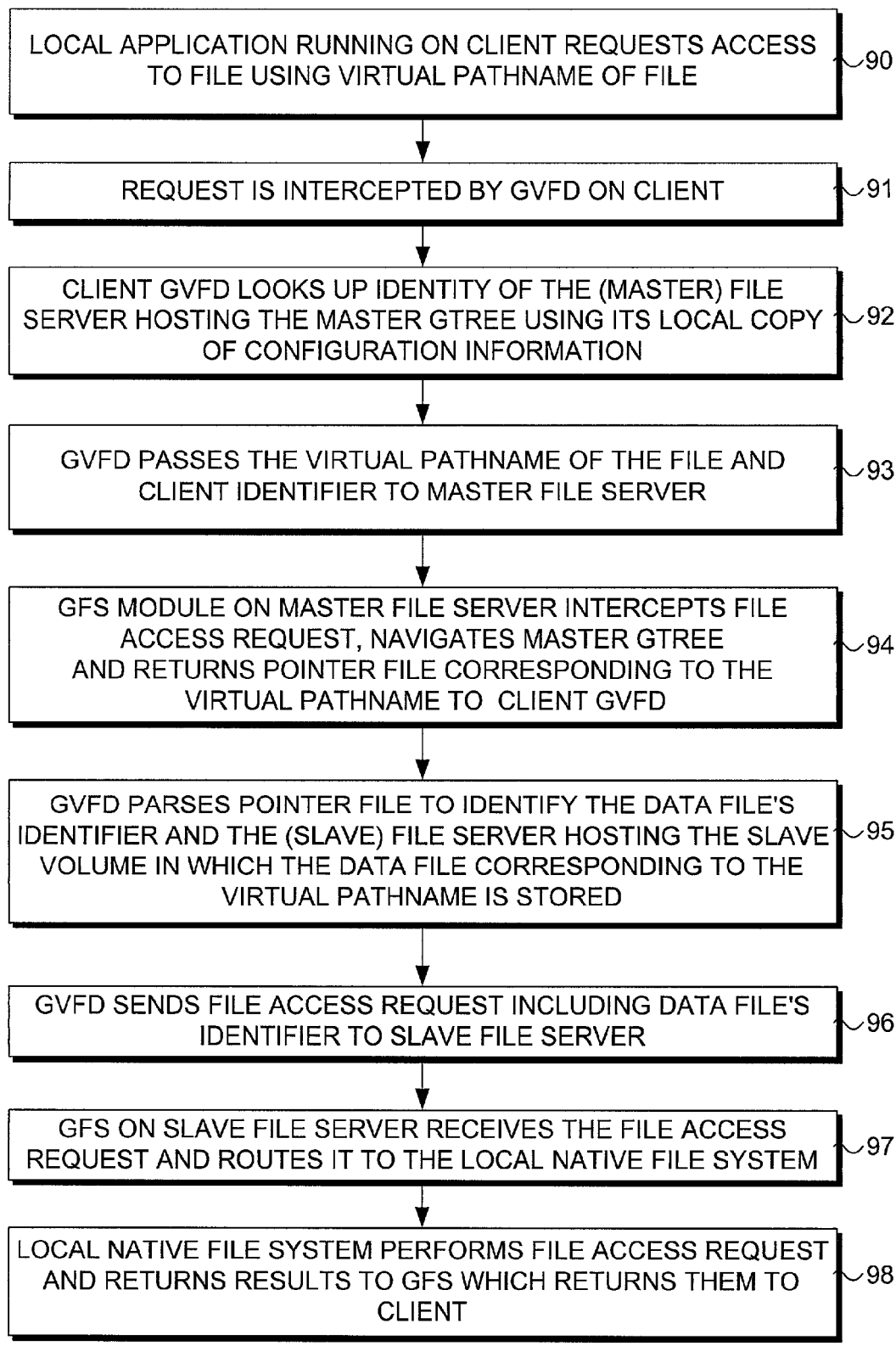
FIG. 9 is a flowchart illustrating the logic used by the present invention when accessing a data file.

With reference to the flowchart of FIG. 9 and FIG. 3, the process for access a data file begins in a block 90 in which a local application (e.g., local application 12) running on a client 11 requests access to the file using the file's virtual pathname. As with a conventional file access request, the request is passed from the user mode level of the OS to the OS kernel, where it is intercepted in a block 91 by GVFD 42 running on client 11. In a block 92, GVFD 42 looks up the identity of the file server hosting the master gtree (the master file server) using its local copy of configuration information 45, and then passes the virtual pathname of the file and a client identifier to the master file server in a block 93. The virtual pathname is sent as a file I/O request via NFS client instance 34A to the master file server, wherein it is received by an NFS Daemon 36. Has shown in FIG. 2 and discussed above, normally NFS Daemon 36 would pass the request to local native file system 38. However, under the invention's virtual file system scheme, GFS module 44 on the master file server intercepts the file access requests in a block 94, navigates the master gtree until is locates the pointer file corresponding to the virtual pathname, whereupon it returns the pointer file to GVFD 42 on the client. In response to receiving the pointer file, GFVD 42 parses the pointer file in a block 95 to identify the data file's identifier and the file server hosting the slave volume (the slave file server) in which the data file is stored. As discussed above, the pointer file includes two GUIDs, wherein the first GUID is used to identify the slave volume and the second GUID (the data file's identifier) is used to determine the physical pathname under which the data file is stored in the slave volume. Once the slave volume is known, the slave file server can be determined by lookup using the local copy of configuration 105 maintained on client 11. This completes the LOOKUP function.

After the file server and data file identifier are known the data file can be accessed. GFVD 42 sends a file access request including the data file's identifier to slave file server in a block 96, whereupon the file access request is intercepted by a GFS module 44 running on the slave. Slave GFS module 44 routes the request to the local native file system 38 corresponding to the slave volume in a block 97. The file access process is completed in a block 98 in which the local native file system performs the file access request and returns the results to the GFS module, which then returns the results to the client.

A generally similar process is used for other types of file and directory accesses in which file system objects are changed, such as when a file or directory is added, deleted, renamed, or moved. The appropriate change is made on the master directory tree. For example, a user may request to add a new data file f into a particular directory d. In response to the file system access request, a new pointer file by the name f is added to the directory d in the master gtree, and the new data file is stored on an appropriate slave volume hosted by one of the file system's file servers.

Figure 10:
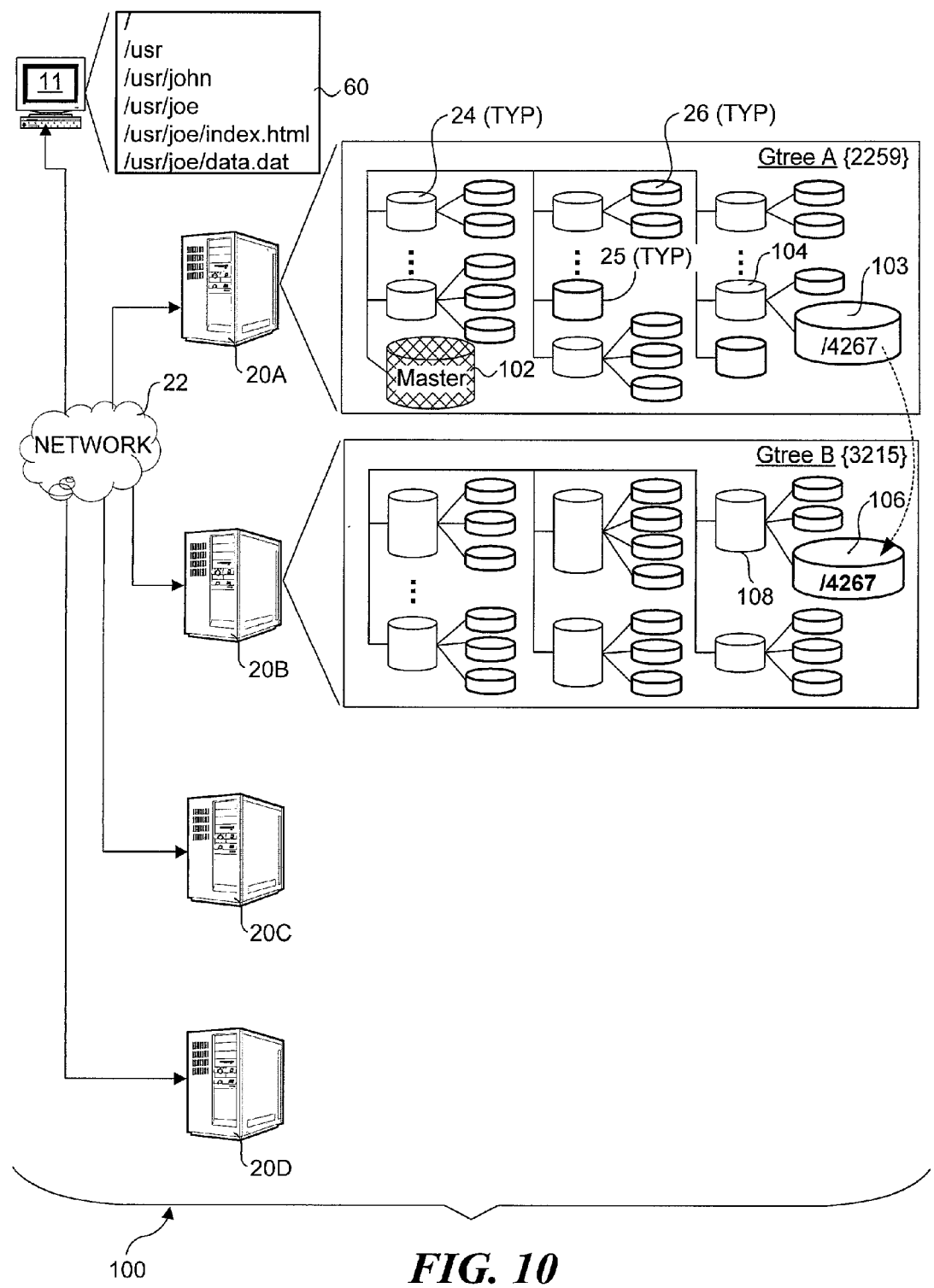
FIG. 10 is a schematic diagram illustrating an exemplary implementation of the present invention wherein a data file is migrated between two file servers.
Figure 11:
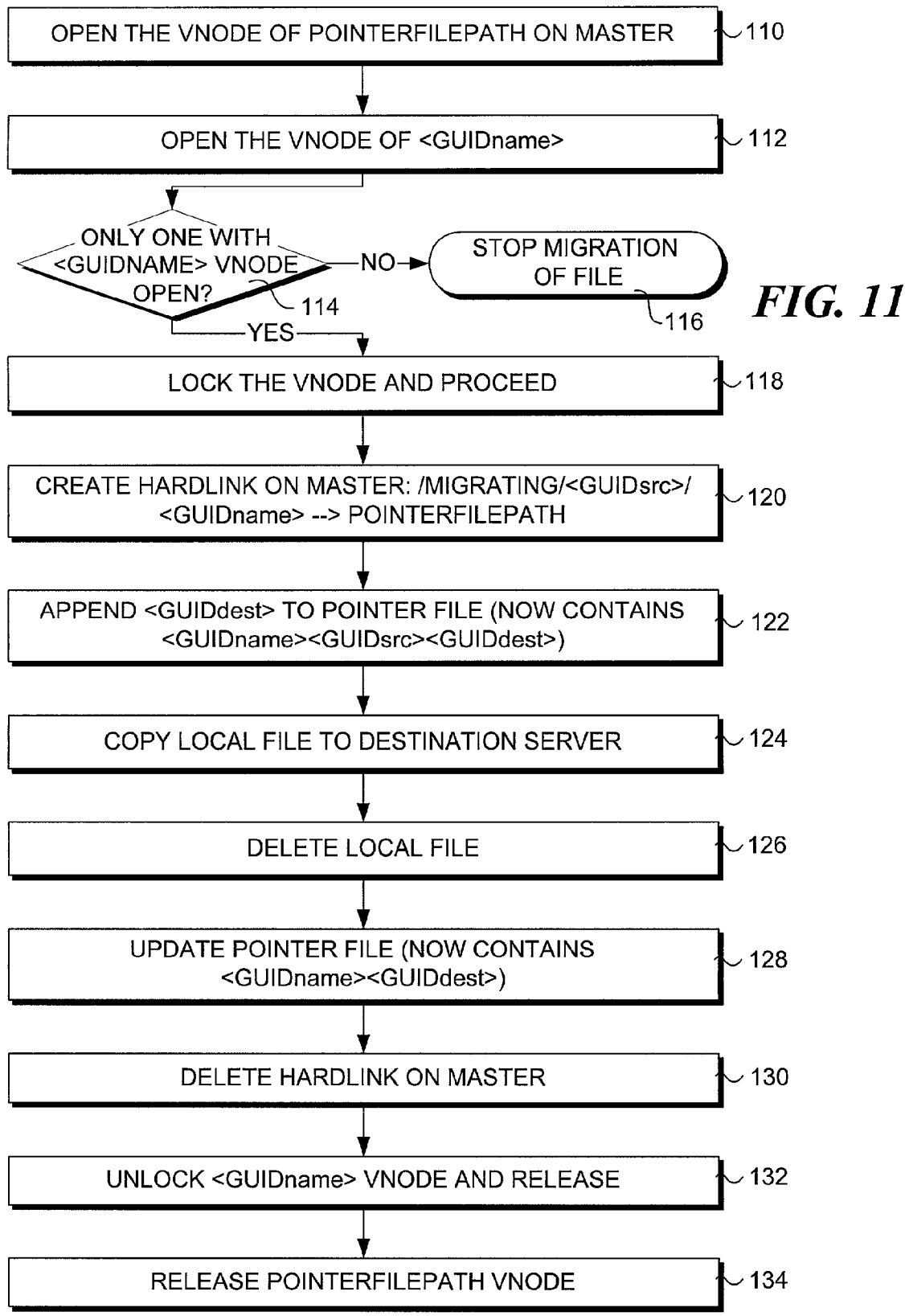
FIG. 11 is a flowchart illustrating the logic used by the present invention when migrating a data file.

An exemplary Gossamer file system 100 is illustrated in FIG. 10. The system includes four file servers 20A, 20B, 20C, and 20D. Each of the file servers supports a single file system from which a respective gtree is generated (i.e., gtrees A, B, C and D). Each files system is stored on a plurality of storage devices 24, each of which may host a single export 25 or multiple exports 26. The master gtree and slave gtrees are stored on volumes of the various servers 102, 24, 25, 26, 108.

Dynamic Scaling and Migration

A significant advantage provided by the invention is the ability to easily scale the virtual file system dynamically without having to change the location or name of any files or directories in the virtual directory and file hierarchy (e.g., user view 60). The file system may be scaled by adding another server to a GVV without taking the system offline, and in a manner that is transparent to users and client applications.

A key function that enables the foregoing system scaling is called data "migration." Data migration enables files to be migrated (i.e., moved) between physical storage devices, including devices hosted by separate servers, in a transparent manner. For example, suppose that Gossamer file system 100 initially included file servers 20A, 20C, and 20D, all of whose underlying file system capacities are becoming full. In order to provide additional storage capacity, the system administrator decides to add file server 20B. In most instances, the first step upon adding a new file server to a Gossamer file system will be to load-balance the system by migrating data files from one or more existing file servers to the new file server.

When a file is migrated, client applications are undisturbed. The GFS module will attempt to migrate a set of files by copying them and deleting them. Write access to a file during migration causes that file's migration to abort. However, any file access after the migration will cause the our GVFD client to access the file in its new migrated location.

Suppose it is desired to migrate the file "data.dat" in the /usr/joe directory from file server 20A to file server 20B, which for illustrative purposes is initially stored in a local export 103 hosted by a storage device 104 on file server 20A and ends up being migrated to a destination export 106 hosted on a storage device 108 on file server 20B. The migration of a file is managed by the GFS module on the source server. With reference to the flowchart of FIG. 11 and FIGS. 12A–D, migrating a data file proceeds as follows. First, in a block 110, the vnode of the pointer (named PointerFilePath) on the master gtree 102 is opened. In a block 112, the vnode of the file (which is local, and whose name is determined by the GUID) is opened. In this example, the GUIDname is 4267. Next, in a decision block 114, a determination is made to whether the migration module is the only process with the vnode open. Effectively, this decision block determines if any client applications presently have access to the data file that is to be migrated. This determination can be made by examining the reference count for the vnode associated with <GUIDname>. If the reference count is greater than one, the migration of the file is stopped, as indicated by a return block 116.

If the reference count is 1, the logic proceeds to a block 118 in which the vnode is locked (preventing subsequent access requests for other users from being granted), and the migration operation is allowed to proceed. In a block 120, a hardlink is created on the master in migrating space 68 (i.e., under the "/Migration" directory) having an entry of "/<GUIDsrc>/<GUIDname>—>PointerFilePath". The GUIDsrc is the slave location identifier which is used to determine the gtree that the file is originally stored in; in this case the GUIDsrc=2259, which corresponds to gtree A, and the hardlink entry is /2259/4267, as shown in FIG. 11A.

Figure 12A:
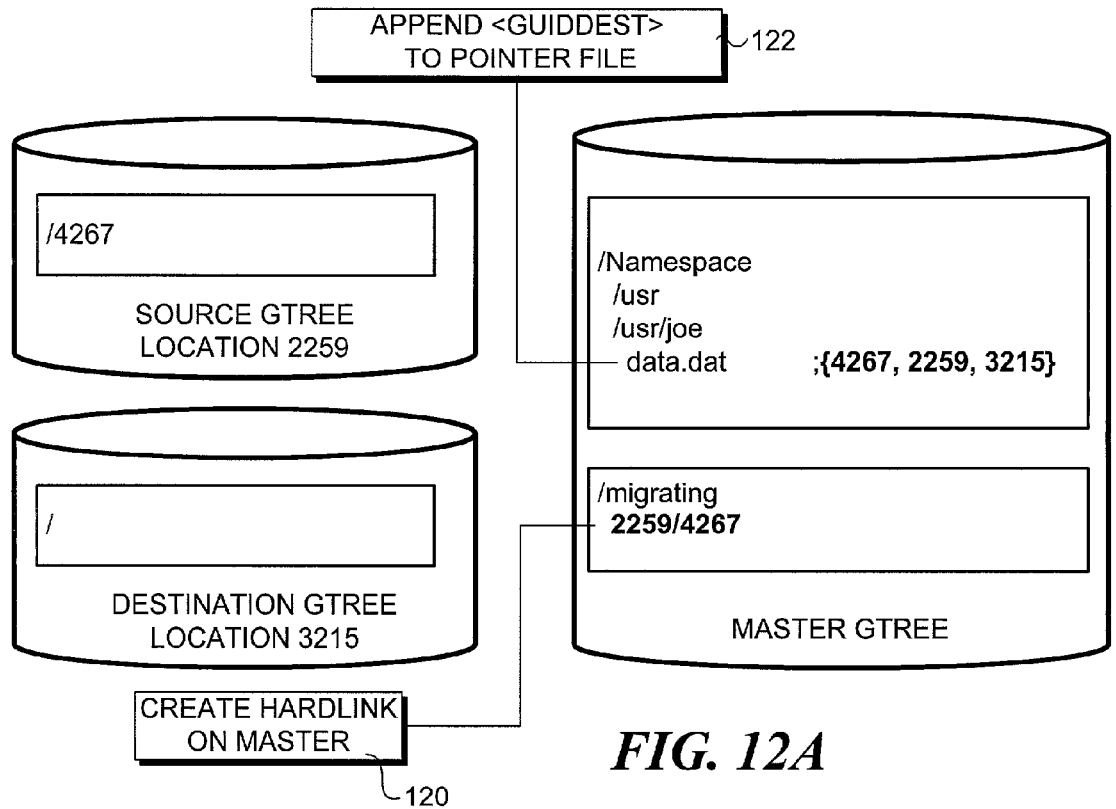
FIGS. 12A–D are schematic diagrams illustrating the state of the master gtree and slave gtrees during the data file migration process.
Figure 12B:
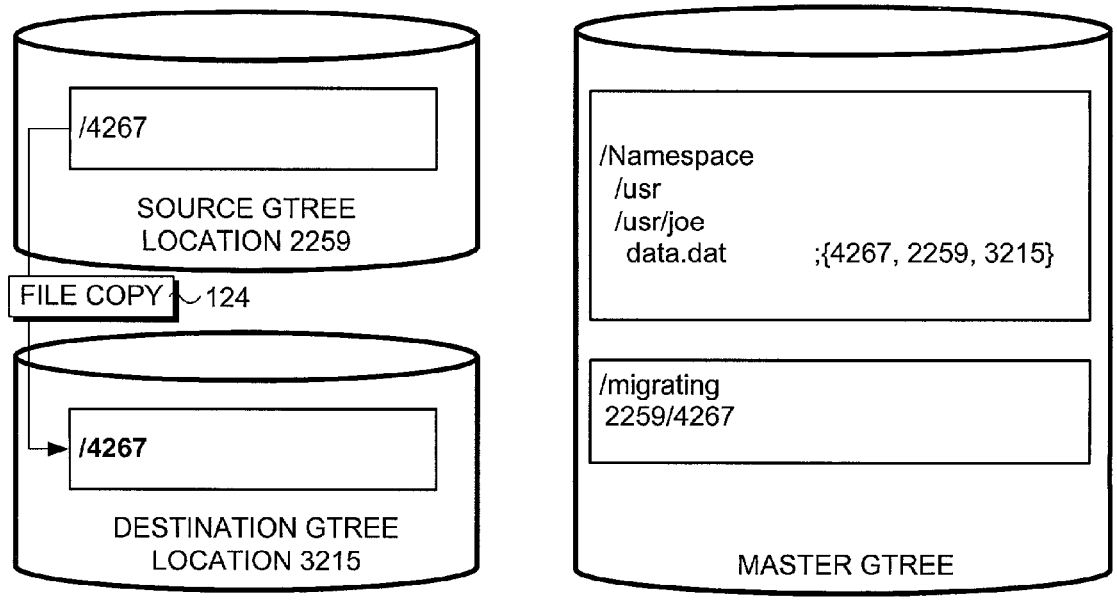
Figure 12C:
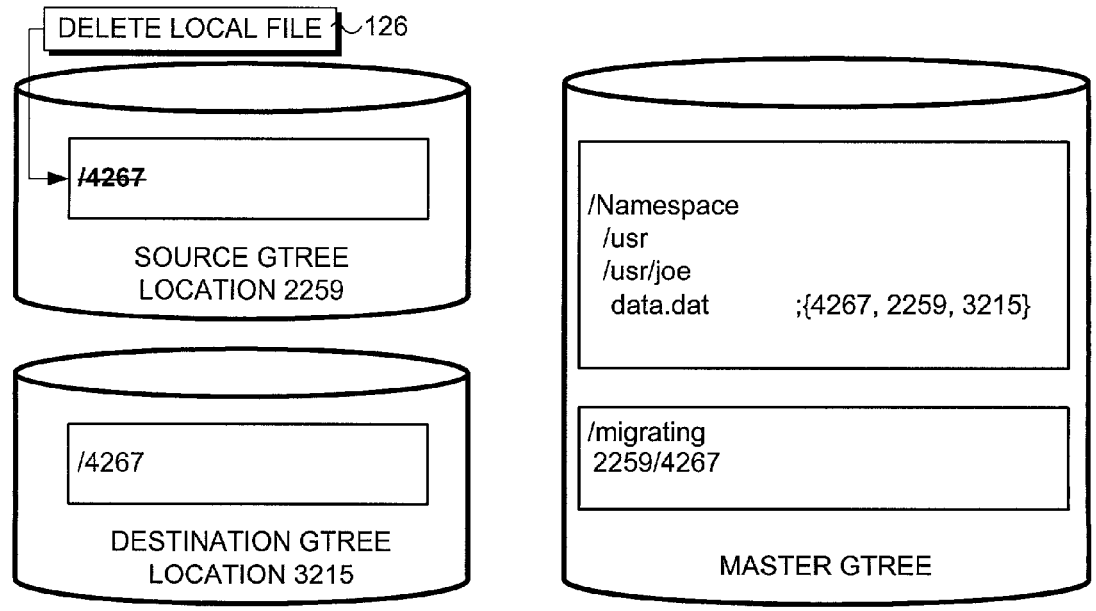

In a block 122, the GUID for the destination gtree (GUIDdest) is appended to the pointer file for the data file, such that the pointer file comprises <GUIDname><GUIDsrc><GUIDdest>. As shown in FIG. 12A, this pointer file now comprises {4267, 2259, 3215}. The file is then copied from its local location to the destination file server in a block 124, as shown in FIG. 12B, whereupon the local file is deleted in a block 126, as shown in FIG. 12C. During the foregoing operations, checks are made to ensure that the file has been successfully copied to the destination prior to deleting the local copy.

Figure 12D:
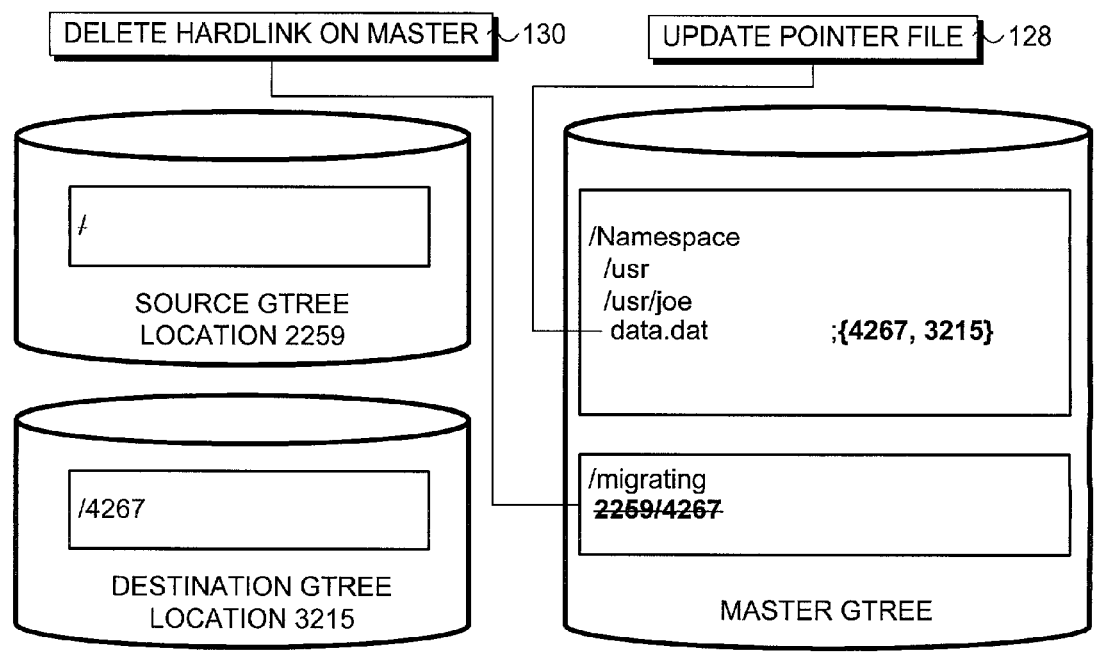

Once the file has been successfully moved, cleanup operations are performed to complete the migration process. This comprises updating the pointer file in a block 128, deleting the hardlink on the master in a block 130, unlocking and releasing the <GUIDname> vnode in a block 132, and releasing the PointerFilePath vnode in a block 134. The results of these cleanup operations are depicted in FIGS. 12C and 12D.

Some embodiments employ a further mechanism to isolate use and migration of a given file, preventing them from occurring simultaneously. In such embodiments any open file request causes that file on the slave to acquire a shared lock. Subsequent close operations release that share lock. Migrations do not attempt to migrate files that are locked by any client. This prevents migration from occurring on any file currently open.

The above procedure is crash-proof by design. At any point, there is enough information in the migrating space and the file pointer to quickly clean up any currently in-progress migration operations when a slave GFS is restarted.

Generally, migration operations are handled through use of Gossamer administration utility 48. This utility enables migrations to be initiated through manual intervention, or enables systems administrators to create migration policies that automatically invoke migration operations when a predetermined set of criteria is determined to occur. For example, a Gossamer system administrator can analyze file system statistics (e.g., percentage of space used, number of files, file accesses, etc.) or merely await broad recommendations from the system. She can enable the system to choose candidates for migration automatically, or select files manually. In addition, she can schedule migrations for one-time, daily or weekly execution through the use of the migration schedule management tool.

Importing a Conventional File System

A non-Gossamer file system must undergo some conversion to be used by Gossamer, and vice versa. According, an import/export tool is provided to perform the conversion. The import tool constructs a new master gtree, or connects to an existing gtree. The import tool then inserts the directory hierarchy of the file system being converted into that master gtree. This involves copying all directories and their attributes and contents. Meanwhile, it assigns all files a GUID and rearranges them in the file hierarchy, so that after conversion the file system will be configured as a slave.

Backup and Restore

Backup and restore of a GVV can be a single operation for a small GVV, in which case a regular GVFD module is run on the master that the backup and restore procedures access. However, most likely each gtree needs to be backed up separately to keep the backup window small. In this instance, a special-purpose GVFD instance is run on each server to manage backup of that server's gtrees. This GVFD provides the backup tool (whether it is provided by SUN or a third party) a partial view of the file system, containing all the directories and the files hosted on the server being backed up.

A Single-gtree backup requires a modified GVFD running on each server, as depicted by a GVFD module 136 in FIG.

3. In this configuration, GVFD module 136 is enabled to access configuration information 45 via an NFS-client instance 138.

Master Gtree Replication

In some implementations, it may be desired to explicitly replicate the master gtree. It is noted that some file systems provide replication functionality wherein various file system data, such as the data corresponding to the master gtree, are replicated by the file system itself. In these type of implementations, the underlying replication of the file system data does not alter the operation of the Gossamer file system, and in fact is transparent to Gossamer. In contrast, an explicitly replicated master gtree means that replication of the master gtree is controlled by Gossamer. Functionality for replicating the master gtree is provided by a replication engine module that is part of the GFS instance that provide access to the master volume. In addition, Gossamer administration agent 46 may include replication management functions. In general, the master gtree will be replicated on a file server that is not the same file server that hosts the original master gtree.

Exemplary File Server Computer System

Figure 13:
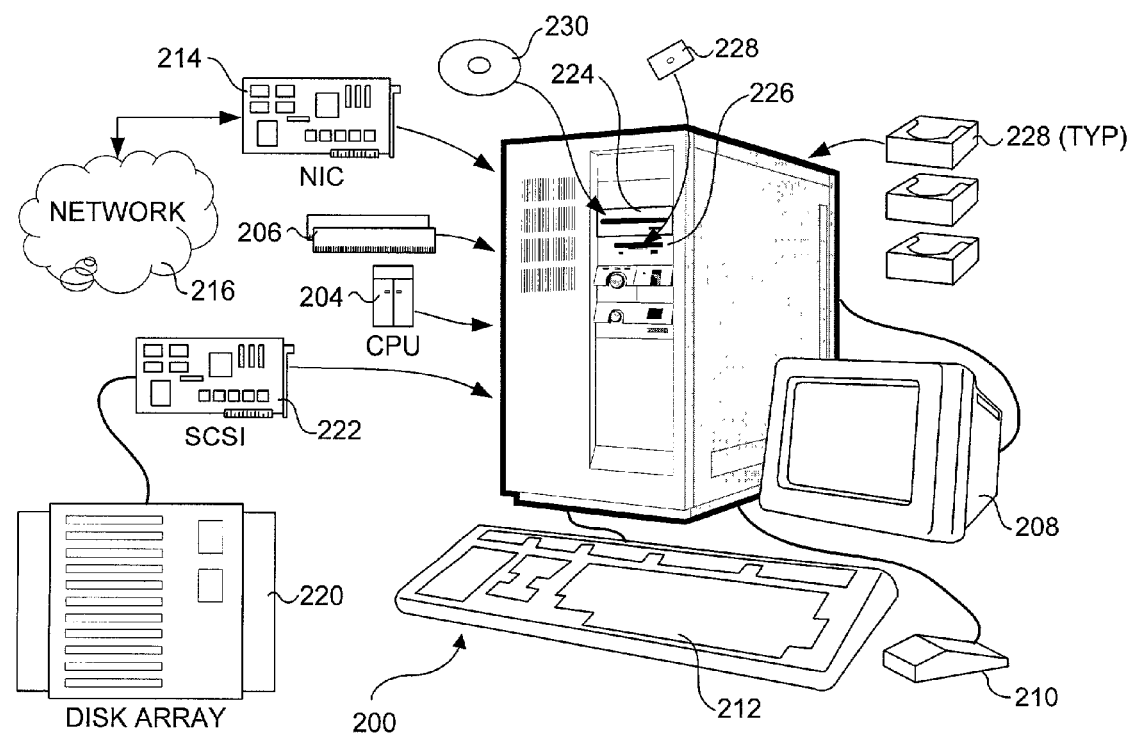
FIG. 13 is a schematic diagram of an exemplary computer system that may be implemented in the present invention.

With reference to FIG. 13, a generally conventional computer server 200 is illustrated, which is suitable for use in connection with practicing the present invention, and may be used for the file servers in a Gossamer virtual file system. Examples of computer systems that may be suitable for these purposes include stand-alone and enterprise-class servers operating UNIX-based and LINUX-based operating systems.

Computer server 200 includes a chassis 202 in which is mounted a motherboard (not shown) populated with appropriate integrated circuits, including one or more processors 204 and memory (e.g., DIMMs or SIMMs) 206, as is generally well known to those of ordinary skill in the art. A monitor 208 is included for displaying graphics and text generated by software programs and program modules that are run by the computer server. A mouse 210 (or other pointing device) may be connected to a serial port (or to a bus port or USB port) on the rear of chassis 202, and signals from mouse 210 are conveyed to the motherboard to control a cursor on the display and to select text, menu options, and graphic components displayed on monitor 208 by software programs and modules executing on the computer. In addition, a keyboard 212 is coupled to the motherboard for user entry of text and commands that affect the running of software programs executing on the computer. Computer server 200 also includes a network interface card (NIC) 214, or equivalent circuitry built into the motherboard to enable the server to send and receive data via a network 216.

File system storage corresponding to the invention may be implemented via a plurality of hard disks 218 that are stored internally within chassis 202, and/or via a plurality of hard disks that are stored in an external disk array 220 that may be accessed via a SCSI card 222 or equivalent SCSI circuitry built into the motherboard. Optionally, disk array 220 may be accessed using a Fibre Channel link using an appropriate Fibre Channel interface card (not shown) or built-in circuitry.

Computer server 200 generally may include a compact disk-read only memory (CD-ROM) drive 224 into which a CD-ROM disk may be inserted so that executable files and data on the disk can be read for transfer into memory 206 and/or into storage on hard disk 218. Similarly, a floppy drive 226 may be provided for such purposes. Other mass memory storage devices such as an optical recorded medium or DVD drive may also be included. The machine instructions comprising the software program that causes processor(s) 204 to implement the functions of the present invention that have been discussed above will typically be distributed on floppy disks 228 or CD-ROMs 230 (or other memory media) and stored in one or more hard disks 218 until loaded into memory 206 for execution by processor(s) 204. Optionally, the machine instructions may be loaded via network 216.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for virtualizing a plurality of underlying file systems hosted on one or more file servers, wherein each file system includes a storage space in which a plurality of data files may be stored comprising:

aggregating the storage spaces of said plurality of file systems into a single virtual storage space that is exported as a virtual volume that appears to clients as local file system;

creating a virtual volume directory and file name hierarchy including a virtual pathname for each data file stored in the virtual volume;

providing a software virtualization layer including both client-side and server-side software components that cooperatively enable clients to access data files stored in the virtual volume through reference to the virtual pathnames for those data files; and maintaining a copy of system configuration information that identifies the file server used to host a master logical volume and one or more file servers hosting one or more slave logical volumes on each client that accesses the virtual file system, wherein clients that access data files stored in the virtual volume do not need to know the file servers and pathnames under which those data files are actually stored;

for each file in the virtual name directory and file hierarchy, data separate from the file system data of the underlying file system is associated with the virtual directory and file name hierarchy, the data including a metadata and a pointer to the file contents stored in one or more underlying file systems;

data describing the virtual volume directory and file name hierarchy is stored in the master logical volume corresponding to one of said underlying file systems; and the data files corresponding to the virtual pathnames in the virtual volume are stored in the one or more slave logical volumes corresponding to at least one of said plurality of underlying file systems.

2. A method for creating a virtual file system that provides clients access to files stored on a plurality of underlying file systems hosted on one or more file servers, comprising:

exporting a virtual file system view to a client comprising a virtual directory and file name hierarchy that includes a virtual pathnames for each data file that may be accessed by the client;

maintaining mapping information that maps the virtual pathname for each file to a file server and physical pathname under which the file is stored on that file server;

maintaining a copy of system configuration information that identifies the file server used to host a master volume and the file servers hosting one or more slave volumes on each of said one or more file servers;

enabling a data file to be accessed by the client through referencing the file by its virtual pathname;

providing a client-side filter that intercepts file system access requests made by the client that reference the virtual pathname to access a file; and routing the file system request to the server and pathname under which the file is actually stored based on the mapping information for the file;

wherein for each file in the virtual directory and file name hierarchy, data separate from the file system data of the underlying file system is associated with the virtual directory and file name hierarchy, the data including a metadata and a pointer to the file contents stored in one or more underlying file systems; and data describing the virtual file system directory and file name hierarchy is stored in the master volume corresponding to one of said underlying file systems and the data files corresponding to the virtual pathnames in the virtual volume are stored in the one or more slave volumes corresponding to at least one of said plurality of underlying file systems.

3. The method of claim 2, wherein the data describing the virtual directory and file name hierarchy comprises a master directory and file hierarchy structure stored on the master logical volume containing directories and files that are named and hierarchically configured to mirror the virtual directory and file name hierarchy.

4. A method for providing a virtual file system that aggregates storage space that is partitioned across a plurality of underlying file systems hosted on one or more file servers, comprising:

enabling clients to create a virtual directory and file name hierarchy in which data files that may be accessed via the virtual file system are identified by a corresponding virtual pathname;

storing the data files on one or more slave logical volumes hosted by said plurality of underlying file systems;

providing a software file, system virtualization layer including both client-side and server-side software components that cooperatively enable clients to access data files stored in the single virtual storage space through reference to the virtual pathnames for those data files by intercepting client file system requests and routing the file system request to the actual file server and pathname under which the file is stored; and storing file mapping data on a master logical volume hosted by one of said plurality of underlying file systems;

wherein for each file in the virtual directory and file name hierarchy, data separate from the file system data of the underlying file system is associated with the virtual directory and file name hierarchy, the data including a metadata and a pointer to the file contents stored in one or more underlying file systems;

the file mapping data contains information for mapping the virtual pathname for a given data file to the actual file server and pathname under which the file is stored; and a copy of system configuration information that identifies the file servers that host each of the master logical volume and the slave logical volumes is maintained on each client that accesses the virtual file system.

5. A virtual file system comprising:

a computer network that connects a plurality of clients to a plurality of file servers;

a plurality of underlying file systems hosted on the plurality of servers in which a plurality of data files are stored;

a server-side software virtualization component running on each file server;

a client-side software virtualization component running on each client, wherein the client-side and server-side software virtualization components cooperatively enable the clients to create a virtual directory and file name hierarchy including a virtual pathname for each data file that is used to access that data file by intercepting client file system requests that reference the virtual pathname of the data file and routing the file system request to the actual file server and pathname under which the data file is stored;

for each file in the virtual directory and file name hierarchy, data separate from the file system data of the underlying file system is associated with the virtual directory and file name hierarchy, the data including a metadata and a pointer to the file contents stored in one or more underlying file systems;

data describing the virtual directory and file name hierarchy is stored in a master logical volume corresponding to one of said underlying file systems;

the data files are stored in one or more slave logical volumes corresponding to at least one of said plurality of underlying file systems; and a primary set of system configuration information that maps each of the master logical volume and the slave logical volumes to the file server that hosts that master or slave logical volume is stored on one of said plurality of file servers and a local copy of the system configuration information is maintained on each of the files servers and each of the clients.

6. The virtual file system of claim 5, wherein the primary set of system configuration information is changed in response to a change in a configuration of the plurality file servers and/or underlying file systems, and wherein each client includes an agent that updates the local copy of the system configuration information stored on the client when the system configuration information is changed.

* * * * *